United States Patent
Koto

(10) Patent No.: US 7,978,768 B2
(45) Date of Patent: Jul. 12, 2011

(54) RECOMPRESSION METHOD AND APPARATUS FOR VIDEO DATA

(75) Inventor: Shinichiro Koto, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1510 days.

(21) Appl. No.: 11/387,758

(22) Filed: Mar. 24, 2006

(65) Prior Publication Data

US 2007/0071097 A1 Mar. 29, 2007

(30) Foreign Application Priority Data

Sep. 29, 2005 (JP) ................................ 2005-284062

(51) Int. Cl.
*H04B 1/66* (2006.01)
*H04N 7/12* (2006.01)
*H04N 11/02* (2006.01)
*H04N 11/04* (2006.01)

(52) U.S. Cl. .............. 375/240.12; 375/240; 375/240.01; 375/240.02; 375/240.13

(58) Field of Classification Search ..... 375/240–240.02, 375/240.12, 240.13
See application file for complete search history.

(56) References Cited

U.S. PATENT DOCUMENTS

| 6,097,435 A * | 8/2000 | Stanger et al. ........... 375/240.03 |
| 6,542,546 B1 * | 4/2003 | Vetro et al. ............... 375/240.12 |
| 6,931,059 B1 * | 8/2005 | Van Dusen et al. ...... 375/240.02 |

FOREIGN PATENT DOCUMENTS

| JP | 11-252546 | 9/1999 |
| JP | 2003-264839 | 9/2003 |
| JP | 2004-228837 | 8/2004 |
| JP | 2005-72799 | 3/2005 |
| WO | 01/58096 A1 | 8/2001 |
| WO | 2005/029237 A2 | 3/2005 |

OTHER PUBLICATIONS

Office Action mailed Nov. 4, 2008 in Japanese Patent Application No. 2005-284062 with English translation.

* cited by examiner

*Primary Examiner* — Curtis B Odom
(74) *Attorney, Agent, or Firm* — Nixon & Vanderhye, P.C.

(57) ABSTRACT

A recompression apparatus for video data possesses a first transcoder, which is able to generate an output video data by recompressing an input video data encoded by a first encode scheme, a second transcoder, which has a compressibility smaller than the first transcoder and is able to generate an output video data by recompressing an input video data by a second encode scheme, and a controller, which receives a recompression parameter including a reduction rate of a target bit rate of an output video data against an input video data, controls a transcoder to carry out compression encoding if the reduction rate is smaller than a threshold value and controls a transcoder to carry out recompression if the reduction rate is equal to or larger than the reduction value.

16 Claims, 8 Drawing Sheets

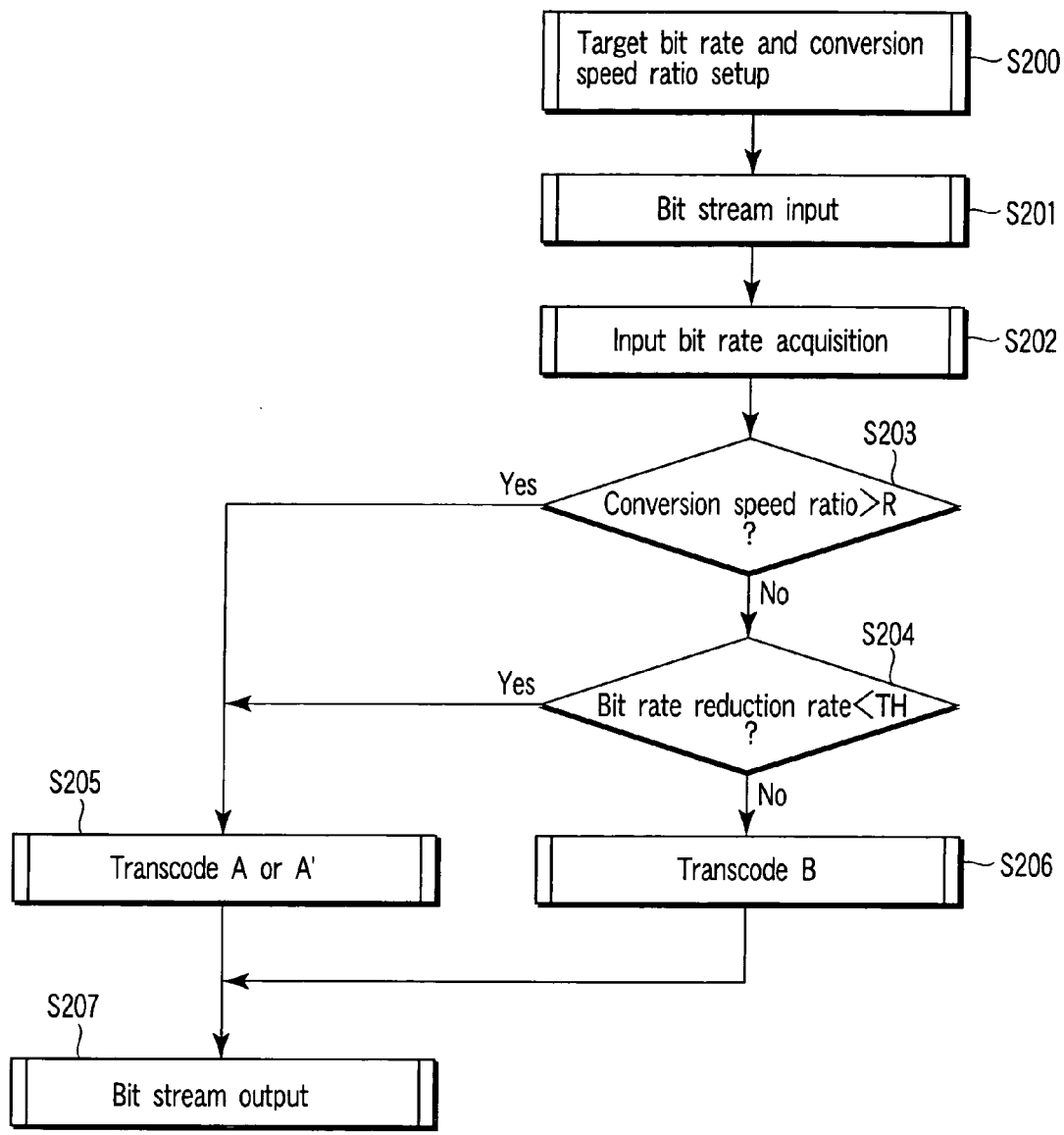
F I G. 8

US 7,978,768 B2

RECOMPRESSION METHOD AND APPARATUS FOR VIDEO DATA

CROSS-REFERENCE TO RELATED APPLICATIONS

This application is based upon and claims the benefit of priority from prior Japanese Patent Application No. 2005-284062, filed Sep. 29, 2005, the entire contents of which are incorporated herein by reference.

BACKGROUND OF THE INVENTION

Field of the Invention

The present invention relates to a method and apparatus to recompress encoded video data.

Various sorts of motion picture encoding international standards schemes, such as motion picture experts group phase 2 (MPEG-2) and motion picture experts group phase 4 (MPEG-4), are adopted respectively in various applications. For instance, MPEG-2 is adopted by a Digital Versatile Disc (DVD), which is a package media or a recording media, and by digital broadcasting of each country. MPEG-4 is mainly used in portable Audio Visual (AV) equipment and in mobile-phone terminals. As stated, conventionally, different encode schemes have been adopted per application. In some cases, the same encode scheme is used by altering its frame rate and resolution.

To achieve the inter-operability between each application, in some cases, a transcode, which accompanies conversions of encode schemes and video data formats, is performed. For conventional household use image equipment, in most cases, a chiefly used encode scheme is restricted to one type each application. Accordingly, by transcoding, a video data encoded in a certain encode scheme is converted into video data based on an encode scheme predetermined in compliance with a target application. Further, transcoding may be performed to reduce amount of data by recompressing the video data in order to achieve long recording of video data for recording medium such as hard discs and recordable DVDs.

To transcode, there are a scheme to reduce an amount of data by recompressing the encoded video data without undergoing decoding (for example, Jpn. Pat. Appln. KOKAI No. 2003-264839), and a scheme to perform recoding by dropping the image size and frame rate in accordance with remaining capacity of the recording media (for example, Jpn. Pat. Appln. KOKAI No. 2004-228837). To correspond to a plurality of applications, a method to select optimum data from among the video data obtained by simultaneously encoding video signals by multiple encode schemes is also known (for example, Jpn. Pat. Appln. KOKAI No. 2005-72799).

Recently, a new motion picture encoding international standards scheme called ITU-T Rec. H.264 (hereinafter referred to as H.264 for simplicity) is recommended. H.264 has a significantly higher compressive performance than MPEG-2 or MPEG-4, and, for instance, is able to reduce the amount of data to approximately half to that of MPEG-2 by the same image quality. In a new image media, such as high definition DVD (HD DVD), an application adopting multiple encode schemes called multi-codec is launching steadily. With this, MPEG-2 and H.264 are to be adopted as essential encode schemes. In such image media supporting multi-codec, encode schemes having different compressive performance and throughput can be chosen according to the purpose at the application side. For instance, when performing transcode for the purpose of long recording, by adaptively selecting a scheme with the highest encoding efficiency, a higher definition recording is achievable.

As disclosed in Jpn. Pat. Appln. KOKAI No. 2005 72799, the simplest scheme to determine an optimum scheme for transcoding is to transcode identical video data by multiple encode schemes, then select an optimum encode scheme from these transcode results. However, if transcoding is performed in parallel by multiple encode schemes, throughput becomes massive. Further, this will require a memory to temporarily store multiple re-encoded data and an accumulation media, resulting in the substantial increase in processing time and processing expense.

BRIEF SUMMARY OF THE INVENTION

According to an aspect of the present invention, there is provided a method for recompressing video data comprising: acquiring a recompression parameter including a reduction rate of reducing a target bit rate of output video data with respect to a bit rate of input video data encoded in a first encode scheme; recompressing the input video data by a first transcoder including the first encode scheme and a first compressibility, if the reduction rate is smaller than a threshold value, to generate the output video data; and recompressing the input video data by a second encode scheme different from the first encode scheme and a second compressibility smaller than the first compressibility, if the reduction rate is not less than the threshold value, to generate the output video data. Here, compressibility is defined by amount of data after compression/amount of data before compression. In other words, higher compression is obtained as the compressibility becomes smaller.

BRIEF DESCRIPTION OF THE SEVERAL VIEWS OF THE DRAWING

FIG. 8 is a flow chart showing another processing sequence of a video compression encode in the first embodiment.

DETAILED DESCRIPTION OF THE INVENTION

Hereinafter, embodiments of the present invention will be explained with reference to the drawings.

First Embodiment

Figure 1:
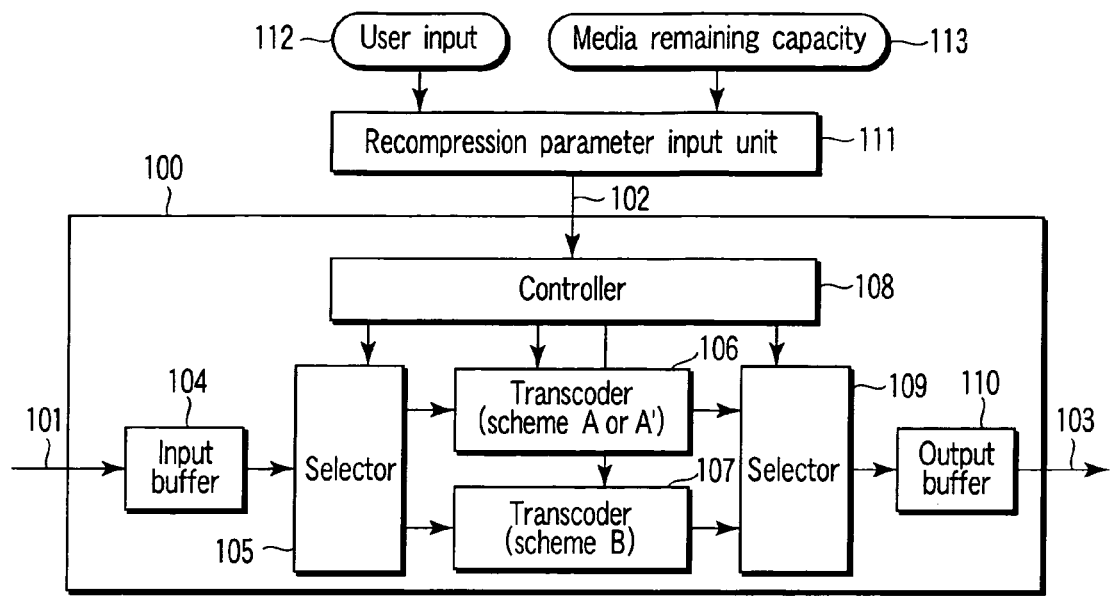
FIG. 1 is a block diagram showing a schematic structure of a video recompression apparatus according to a first embodiment of the present invention.

As illustrated in FIG. 1, in a video recompression apparatus 100 according to a first embodiment of the present invention, input video data 101 and recompression parameter 102 are externally input. The input video data 101 is generated by encoding an original video signal by a first encode scheme. In the video recompression apparatus 100, recompression is performed based on the recompression parameter 102, and output video data 103 is generated. The video recompression apparatus 100 includes an input buffer 104, a selector 105, a first transcoder 106, a second transcoder 107, a controller 108, a selector 109 and an output buffer 110.

A recompression parameter input unit 111 is adapted to input the recompression parameter 102 in accordance with, for example, a user input 112 and a media remaining capacity 113. When recording the output video data 103 on a recording media such as a DVD, the user input 112 indicates information such as image quality mode (for example, standard definition, low definition and high definition), recording time and recording rate (for example, low speed, standard speed and high speed) desired by a user. The media remaining capacity 113 indicates information on remaining capacity of the recording media. These image quality mode, recording time, recording rate and media remaining capacity are used to determine the target bit rate and conversion rate indicator, which are the recompression parameter 102.

The target bit rate is a bit rate to be possessed by the output video data 103 and is usually smaller than the bit rate of the input video data 101. Generally, the target bit rate is set higher as a higher image quality, a shorter recording time and a larger media remaining capacity are required by a user. The conversion rate indicator indicates the time required for the process of converting the input video data 101 into the output video data 103. Accordingly, the faster the reading rate of the input image data 101 and the faster the output rate of the output image data 103, the higher the conversion rate indicator can be set, enabling a high speed conversion. As described later, a conversion rate ratio is used as the conversion rate indicator.

The recompression parameter 102 input in such manner is given to the controller 108, which comprises a CPU and software. The controller 108 adaptively selects either one transcoder from transcoders 106 and 107 which transcodes the video data 101 most efficiently, in accordance with the recompression parameter 102, and operates only the selected transcoder. Further, the controller 108 controls selectors 105 and 109 to input the input video data 101 in the selected transcoder and to output the output video data 103 from the selected transcoder.

The input video data 101 is temporarily stored in the input buffer 104. The video data read out from the input buffer 104 is input to the transcoder, i.e., either one of the transcoder 106 or 107, selected by the selector 105. Transcoding, i.e., recompression, is performed by the selected transcoder, and an encoded output video data 103 is generated. The output video data 103 is temporarily stored in the output buffer 110 through the selector 109 and is output from the output buffer 110.

The first transcoder 106 transcodes, i.e., recompresses, the input video data 101 by a first encode scheme. For example, if the input video data 101 is encoded by MPEG-2, the first transcoder 106 recompresses the input video data 101 by MPEG-2 and generates the output video data 103. The second transcoder 107 transcodes, i.e., recompresses, the input video data 101 by a second encode scheme, which is different from the first encode scheme. The second encode scheme has a smaller compressibility than the first encode scheme. As mentioned above, compressibility is the ratio of amount of data after compression/amount of data before compression, meaning that a higher compression is achieved, i.e., a high compression efficiency is obtained, as the compressibility becomes smaller. When replacing compressibility by compression ratio (=amount of data before compression/amount of data after compression), the second encode scheme becomes larger than the first encode scheme.

For example, the second transcoder 107 recompresses the input video data 101, which is encoded by MPEG-2, by H.264 and generates an output video data. Here, as an example, MPEG-2 is cited as the first encode scheme and H.264 is cited as the second encode scheme. However, these are merely examples.

Figure 2:
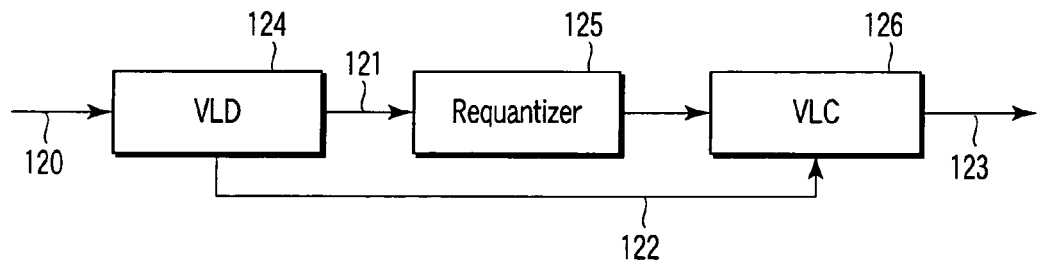
FIG. 2 is a block diagram showing a first specific example of a transcoder.

Next, specific examples of transcoders 106 and 107 in FIG. 1 are explained. FIG. 2 illustrates a second specific example of a transcoder 106, which does not accompany an encode scheme conversion. An input video data 120 encoded by a first encode scheme (such as, MPEG 2) is input to a variable length decoder 124. In the variable length decoder 124, by decoding a variable-length code or an arithmetic code for the input video data 120, orthogonal transformation coefficient information 121, such as a DCT coefficient, and other side information 122 are separated. The side information 122 includes, for example, a motion vector and prediction mode information. The orthogonal transformation coefficient information 121 is re-quantized by a re-quantizer 125. The re-quantized orthogonal transformation coefficient information and the side information 122 from the variable length decoder 124 are input to a variable length coder 126. In the variable length coder 126, by carrying out the usual variable length encoding or arithmetic encoding, output video data 123, which is encoded by the first encode scheme, is output. For example, if the input video data 120 is encoded by an MPEG-2 scheme, the output video data 123 is also output as data encoded by the MPEG-2 scheme.

Figure 3:
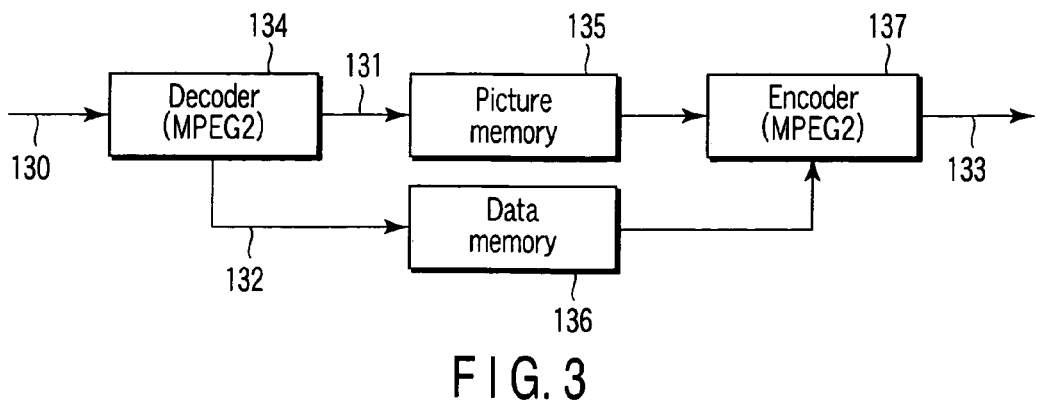
FIG. 3 is a block diagram showing a second specific example of a transcoder.

FIG. 3 illustrates another specific example of a transcoder 106, which does not accompany an encode scheme conversion. Input video data 130 encoded by a first encode scheme (such as MPEG 2) is input to a decoder 134, which corresponds to the first encode scheme. By carrying out decoding for the input video data 130 at the decoder 134, a reconstructed video signal 131 and side information 132, such as a motion vector and prediction mode information, are generated. The reconstructred video signal 131 is temporarily stored in a picture memory 135. The side information 132 is temporarily stored in a data memory 136.

A re-encoder 137 corresponding to the first encode scheme reads in the video signal stored in the picture memory 135 and, by carrying out re-encoding in reference to the side information stored in the data memory 136, generates output video data 133 encoded by the first encode scheme. For example, if the input video data 130 is encoded by an MPEG-2 scheme, the output video data 133 is also output as a data encoded by the MPEG-2 scheme.

Figure 4:
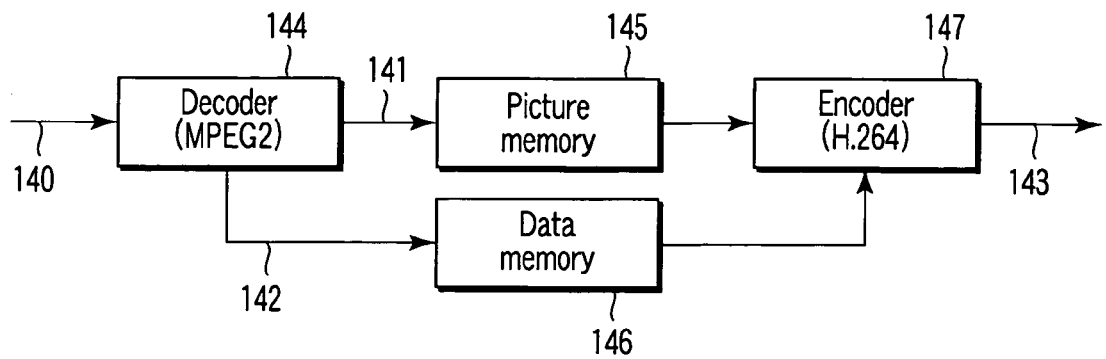
FIG. 4 is a block diagram showing a third specific example of a transcoder.

FIG. 4 illustrates a specific example of a transcoder 107 accompanying an encode scheme conversion. Input video data 140 encoded by a first encode scheme is input to a decoder 144 corresponding to the first encode scheme. By carrying out decoding for the input video data 140 at the decoder 144, a reproduced video signal 141 and side information 142, such as a motion vector information and prediction mode information, are generated. The reproduced video signal 141 is temporarily stored in a picture memory 145. The side information 142 is temporarily stored in a data memory 146.

An encoder 147 corresponding to a second encode scheme reads in the video signal stored in the picture memory 145 and, by carrying out re-encoding in reference to the side information stored in the data memory 146, generates output video data 143 encoded by the second encode scheme. For example, if the input video data 140 is encoded by an MPEG-2 scheme, the output video data 143 is output as data encoded by an H.264 scheme.

Figure 5:
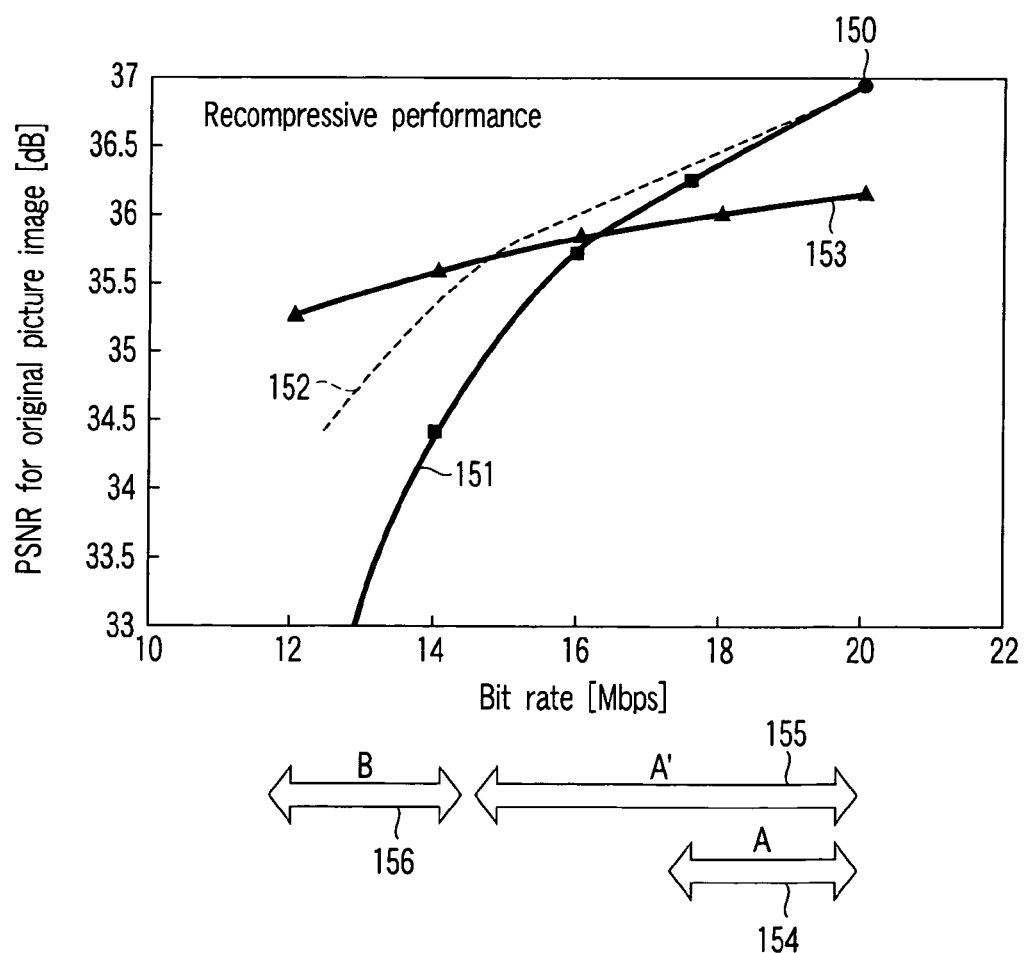
FIG. 5 illustrates an example of relations between a bit rate of an output video data obtained by recompressing an input video data and a PSNR for a video signal obtained by decoding an output video data with respect to an original video signal.

Next, a compressive performance characteristic of the transcoder shown in FIG. 2, FIG. 3 and FIG. 4 are explained by using FIG. 5. FIG. 5 illustrates an example of the relation between a bit rate of output video data obtained by recompressing input video data and a peak signal to noise ratio (PSNR) for a video signal obtained by decoding an output video data with respect to an original video signal. Here, the input video data is generated by encoding the original video signal by a first encode scheme. PSNR is an indicator of an encoding distortion. Image quality improves as the PSNR rises. The encoding distortion increases as the PSNR drops.

Point 150 in FIG. 5 indicates an example of a bit rate (approximately 20 Mbps) of an input video data, which is obtained by encoding a high definition television (HDTV) picture signal by MPEG-2, and PSNR (approximately 37 dB). Curve 151 in FIG. 5 shows the relation between a PSNR and a bit rate of output video data in the case of recompressing input video data with a plurality of bit rates by using the transcoder in FIG. 2. Curve 152 in FIG. 5 shows the relation between a PSNR and a bit rate of an output video data in the case of carrying out recompression, where an input video data is re-encoded after decoding, by the transcoder shown in FIG. 3.

When carrying out recompression by the transcoder in FIG. 2, by decreasing the bit rate of the output video data from that of the input video data as shown in the curve 151, PSNR becomes smaller, and the transition of the image quality degradation is observed. More specifically, as the transcoder in FIG. 2 performs recompression by re-quantization, accompanied by inter-frame prediction, quantization error is propagated in the direction of time or space. Further, by degrading the bit rate, the transcoder in FIG. 2 degrades the PSNR drastically.

Meanwhile, the transcoder in FIG. 3 performs re-encoding using the same encode scheme (such as MPEG-2) as the input video data by using side information such as the motion vector extracted from the input video data. Accordingly, when the difference between the bit rates of the output video data and the input video data is small, a compressive performance equivalent to the characteristics illustrated by the curve 151 when using recompression by re-quantization, is obtained as shown by curve 152. Further, in the transcoder of FIG. 3, as there is no influence from the propagation of quantization error, when the bit rate is further reduced, the degradation of PSNR (increase in the encoding distortion) becomes smaller than in the case of re-quantization shown by the curve 151.

Curve 153 in FIG. 5 illustrates the relation between PSNR and bit rate of an output video data in the case of carrying out recompression, where an input video data is re-encoded after decoding, by the transcoder shown in FIG. 4. The transcoder in FIG. 4 carries out re-encoding by using an encode scheme (such as H.264), which is different from the encode scheme of an input video data, while using side information, such as, motion vectors included in the input video data.

In other words, in the transcoder of FIG. 4, encode schemes between the input video data and the output video data differ, wherein the encode scheme of the output video data is a lossy compression. Therefore, in the transcoder of FIG. 4, even in the case where the difference between the bit rate of the output video data and that of the input video data is small, the image quality is prone to degrade due to encoding distortion. However, the compressive performance of H.264 about doubles that of MPEG-2, i.e., it is said to be able to encode the same image quality with half the bit rate. For this reason, there is less image quality degradation involved in the drop of bit rate, therefore, in comparison with the other encode schemes illustrated by curves 151 and 152, there is less image quality degradation in the same bit rate in accordance with the drop of bit rate after recompression.

In summary of the above, when generating output video data by recompressing the encoded input video data by transcoding, the following characteristics are found.

(i) When the bit rate difference (the difference between the bit rates of the input video data and the output video data) before and after recompression is small, degradation of image quality can be suppressed by carrying out recompression using the same encode scheme as the input video data.

(ii) When recompressing the input video data by re-quantization in the same encode scheme as the input video data, the encoding efficiency drops drastically in accordance with the increase in the bit rate difference before and after recompression.

(iii) When the bit rate difference before and after recompression is small, rather than using an encode scheme different from the input video data and an encode scheme with higher compressive performance for recompression, there is less degradation of image quality using the same encode scheme as the input video data for recompression.

(iv) When the bit rate difference before and after recompression is large, it is effective to use an encode scheme with higher compressive performance for recompression.

The present embodiment enables optimization of encoding efficiency by selecting the encode scheme for recompression in view of the above characteristics (i), (ii), (iii) and (iv). In FIG. 5, a transcode scheme performed by re-quantization which illustrates the characteristic of curve 151 is referred to as "A", a transcode scheme performed by re-encoding by the same encode scheme which illustrates the characteristic of curve 152 is referred to as "A'", and a transcode scheme carrying out re-encoding using another encode scheme which has a higher encoding efficiency illustrated by curve 153 is referred to as "B".

Arrows 154, 155 and 156 in FIG. 5 indicate the range of various bit rates of output video data and transcode schemes suited to these ranges. When carrying out recompression in the bit rate range indicated by arrow 154, encoding efficiency of scheme A or scheme A' is higher in comparison to scheme B. When carrying out recompression in the bit rate range indicated by arrow 155, encoding efficiency of scheme A' is averagely high. When carrying out recompression in the bit rate range indicated by arrow 156, encoding efficiency of scheme B is higher in comparison to scheme A or A'. As mentioned above, an optimum transcode scheme varies depending on the bit rate range of the output video data, i.e., the bit rate of the input video data with respect to the bit rate of the output video data.

Figures 6, 7:
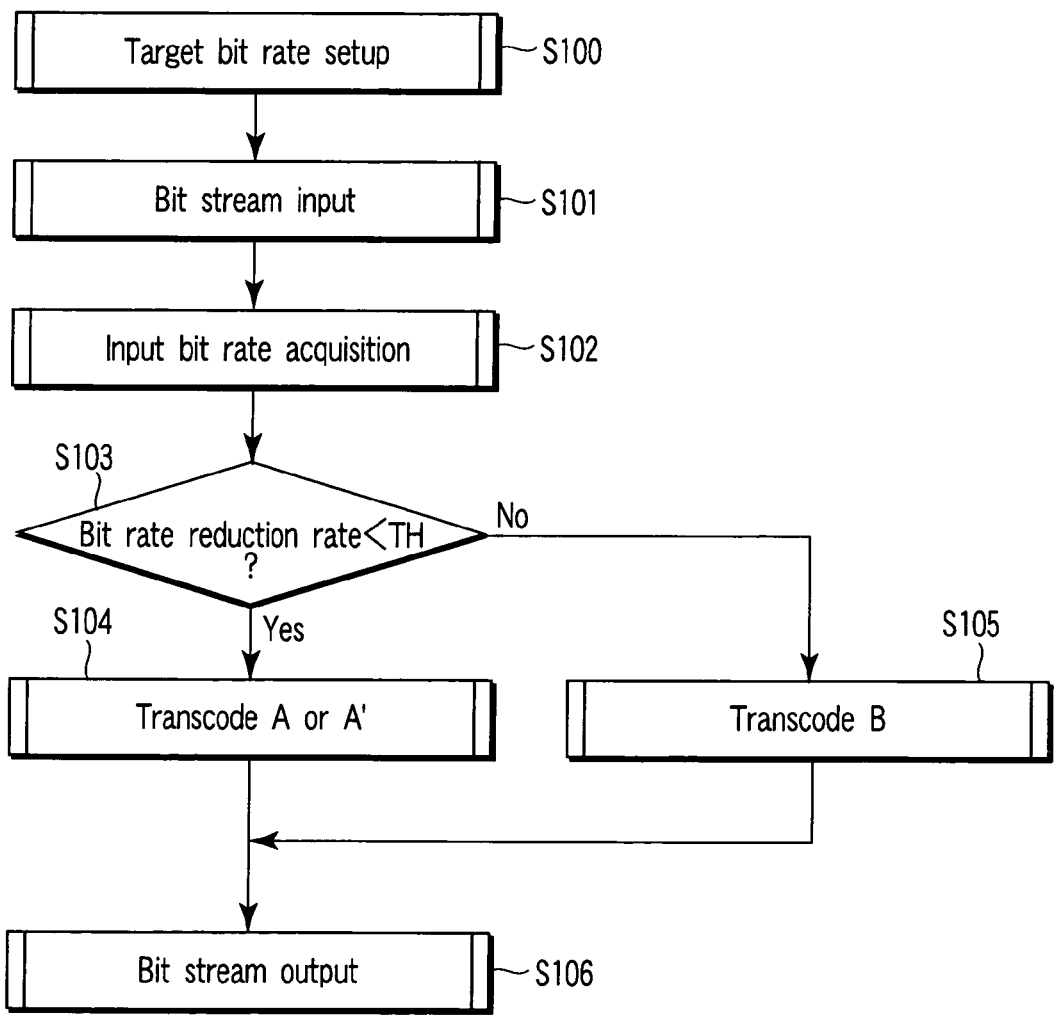
FIG. 6 illustrates an example of a ratio of an average processing load of each transcode scheme.
FIG. 7 is a flow chart showing a processing sequence of a video compression encode in the first embodiment.

Further, throughput also varies considerably depending on the transcode scheme. FIG. 6 shows an example of the ratio of average processing load for each transcode scheme. Scheme A, which carries out recompression by only a re-quantization, has the least processing load. Scheme B, which carries out re-encoding by an encode scheme with high encoding performance, has a high processing load in order to obtain high encoding performance. In the domain with less bit rate reduction amount indicated by arrow 154 in FIG. 5, as the difference of encoding efficiency between scheme A and A' is small, by using scheme A which has a less processing load, it is possible to reduce the processing load without an image quality degradation.

Based on the above points, a processing procedure for the first embodiment will be explained by using the flow chart shown in FIG. 7. First, at the recompression parameter input unit 111, a target bit rate of an output video data 103 acquired by transcode is set in accordance with, for example, the user input 112 or the media remaining capacity 113 (step S100). In such state, an input bit stream, i.e., the bit stream of video data 101, is input (step 101), and a bit rate of the input bit stream (referred to as input bit rate) is further obtained (step S102). The input bit rate is obtained from an upper system, which is not shown, by controller 108. As explained latter, the bit rate can also be measured from the input bit stream.

Next, a bit rate reduction rate of reducing the target bit rate with respect to the input bit rate shown in the following equation is compared with a threshold value TH (step S103).

$$\text{Bit rate reduction rate} = (\text{input bit rate} - \text{target bit rate}/\text{input bit rate}) \times 100\% \quad (1)$$

The bit rate reduction rate shown in this equation (1) normalizes the difference of the target bit rate with respect to the input bit rate by the input bit rate.

In step S103, when the bit rate reduction rate is smaller than the threshold value TH, a transcode of A or A' is performed (step 104).

When the bit rate reduction rate is equal or greater than the threshold value in step S103, transcode is performed based on scheme B (step S105). Lastly, a bit stream of output video data 103 generated by the transcodes of step S104 or S105, i.e., an output bit stream, is output (step S106).

Threshold value TH can be arbitrarily chosen from among, for example, 10%, 15%, 20%, 30%, 40%, 50%, etc., in compliance with a transcode scheme or encode scheme. Further, it has been omitted in FIG. 7, but if the input bit rate is below the target bit rate, that is to say, if the bit rate reduction rate is equal to or less than 0, the input bit stream should be simply output as an output bit stream.

In accordance with the processing procedure shown in FIG. 7, by exploiting the nature of each transcode scheme explained by using FIG. 5, an optimum transcode scheme can be automatically determined from among transcode A or A', which does not particularly accompany an encode scheme conversion, and transcode B, which accompanies an encode scheme conversion. In other words, an optimum transcode scheme is automatically selected without the user's particular attention. As a result, the input bit stream is recompressed in order to approach the target bit rate with an arbitrary bit rate and, constantly, with high image quality and high efficiency.

Next, by using a flow chart shown in FIG. 8, other processing procedures for the first embodiment will be explained. First, a conversion speed ratio, which is a conversion speed from the input video data 101 to the output video data 103, is set along with a target bit rate (step S200). In such state, an input bit stream is input (step S201), and an input bit rate is further obtained (step S202).

Next, the conversion speed ratio is compared with a predetermined value R (step S203). The conversion speed ratio is defined by the ratio of playback time of the output video data 103 with respect to processing time required to convert the input video data 101 to the output video data 103. For example, values such as 4, 3 and 2 are set for the conversion speed ratio. When the conversion speed ratio is 4, it denotes that the conversion is performed by the fourfold of real time. Further, a bit rate reduction rate of the target bit rate is compared to a threshold value TH likewise the case of FIG. 7 (step S204).

When the conversion speed ratio is larger than the predetermined value R in step S203, or if the bit rate reduction rate is smaller than the threshold value TH in step S204, the transcode of scheme A or A' is performed (step S205).

If the conversion speed ratio is equal to or less than the predetermined value R in step S203, and if the bit rate reduction rate is equal to or larger than the threshold value TH in step S204, the transcode of scheme B is performed (step S206).

Lastly, the bit stream of output video data 103 generated by the transcode of step S205 or S206, i.e., the output bit stream, is output (step S207). Further, the aforementioned predetermined value R is determined in accordance with the processing speed of steps 206 and 205. In other words, it is given that the conversion speed ratio of step S206 is equal to or less than R and the conversion speed ratio of step S205 is larger than R.

Further, it has been omitted in FIG. 8, but if the input bit rate is below the target bit rate, the input bit stream can be simply output as an output bit stream.

By simultaneous use of the conversion speed indicator in this manner, it is possible to select a transcode scheme, which also reflects a recording speed desired by a user.

As mentioned above, according to a first embodiment, by utilizing the quality of recompression characteristics given by the difference in transcode schemes, a transcode scheme suitable for recompression is selected based on the reduction rate of the target bit rate of the output video data with respect to the bit rate of the input video data. Accordingly, recompression with a high encoding efficiency at all times can be performed in an arbitrary bit rate without increasing throughput.

Second Embodiment

Figure 9:
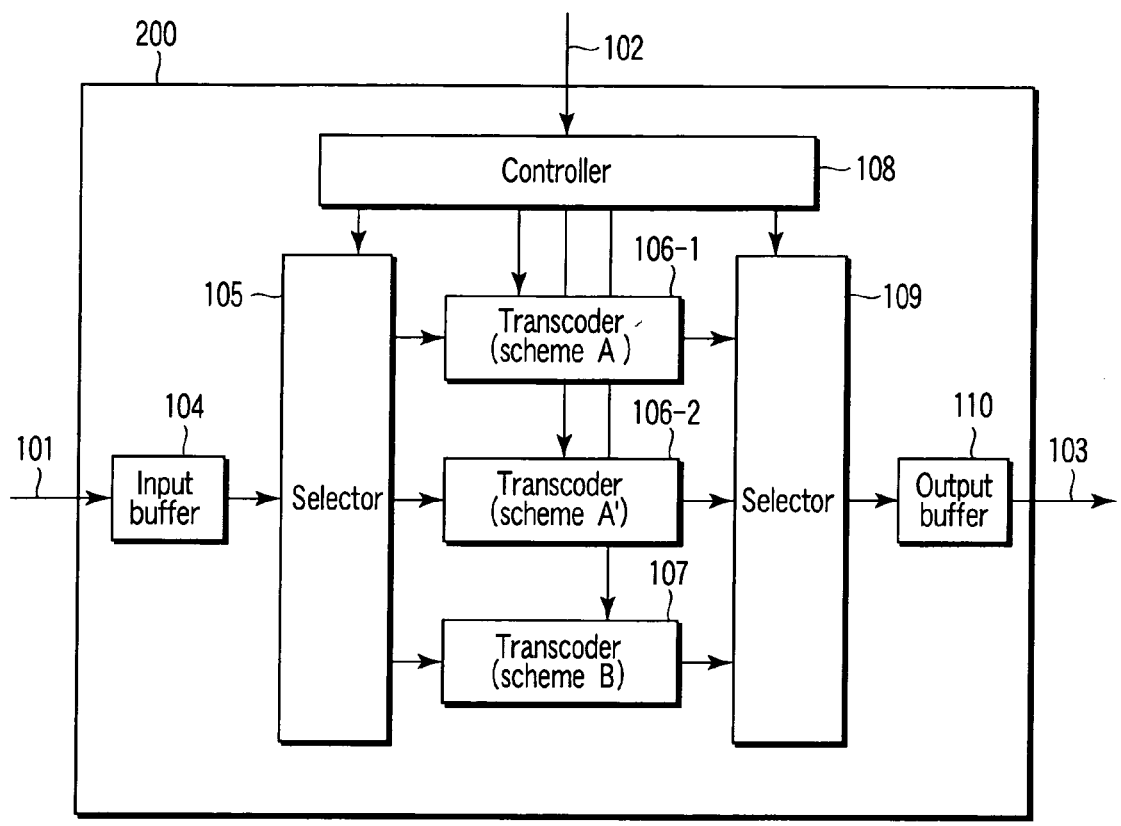
FIG. 9 is a block diagram showing a schematic structure of a video recompression apparatus according to a second embodiment of the present invention.

FIG. 9 shows a video recompression apparatus 200 in accordance with a second embodiment of the present invention. In FIG. 9, portions identical to those in FIG. 1 will be explained by applying the same numbers used in FIG. 1. For the video recompression apparatus 200 in the second embodiment, transcoder 106 in the first embodiment shown in FIG. 1 is replaced by a transcoder 106-1 based on scheme A as illustrated in FIG. 2 and transcoder 106-2 based on scheme A' as illustrated in FIG. 3. For example, suppose the first encode scheme is MPEG-2, transcoder 106-1 carries out a transcode using re-quantization based on MPEG-2, transcoder 106-2 carries out a transcode using re-encoding based on MPEG-2, and transcoder 107 carries out a transcode using re-encoding of MPEG-2 format to H.264 format.

Controller 108 adaptively selects a transcoder among transcoders 106-1, 106-2 and 107, which transcodes the video data 101 most efficiently in accordance with a recompression parameter 102, and runs only the selected transcoder. Like the first embodiment, the compression parameter 102 is a parameter which determines a target bit rate and conversion speed indicator, and is input according to the aforementioned user input and media remaining capacity. Further, controller 108 controls selectors 105 and 109 in order to input the input video data 101 to the transcoder selected by the controller 108, and output the output video data 103 received from the selected transcoder. Thus, a high quality transcode can be performed constantly with a high encoding efficiency in an arbitrary bit rate.

Next, processing procedures of the second embodiment will be explained by using a flow chart shown in FIG. 10. First, a target bit rate of the output video data 103 is set, for example, in accordance with a user input or media remaining capacity 113 (step S300). In such state, an input bit stream, i.e., a bit stream of the video data 101 is input (step S301), and a bit rate (referred to as input bit rate) of the input bit stream is further obtained (step S302). The input bit rate is obtained from an upper system not shown in the figure by the controller 108. As explained latter, the bit rate can also be measured from the input bit stream.

Next, a bit rate reduction rate of reducing the target bit rate with respect to the input bit rate is determined in accordance with equation (1) in order to examine whether the bit rate reduction rate is equal to 0 or less (step S303). If the bit rate reduction rate is 0 or less, the input bit stream is simply output as an output bit stream (step S309).

If the bit rate reduction rate is not 0 or less, the bit rate reduction rate is then compared to a first threshold value TH1 (such as TH1=15%), which is larger than 0 (step S304).

In step S304, if the bit rate reduction rate is smaller than the threshold value TH1, transcode is performed by scheme A using transcoder 106-1 (step S306).

In step S304, if the bit rate reduction rate equals or exceeds the threshold value TH1, the bit rate reduction rate is then compared to a second threshold value TH2 (such as TH2=30%), which is larger than TH1 (step S305).

In step S305, if the bit rate reduction rate is smaller than the threshold value TH2, i.e., TH1<bit rate reduction rate<TH2, transcoding is performed by scheme A' using transcoder 106-2 (step S307).

In step S305, if the bit rate reduction rate is larger than the threshold value TH2, transcoding is performed by scheme B using transcoder 107 (step S308).

Lastly, a bit stream of output video data 103, which is generated by steps S306, S307 and S308, i.e., an output bit stream, is output (step S309).

Figure 10:
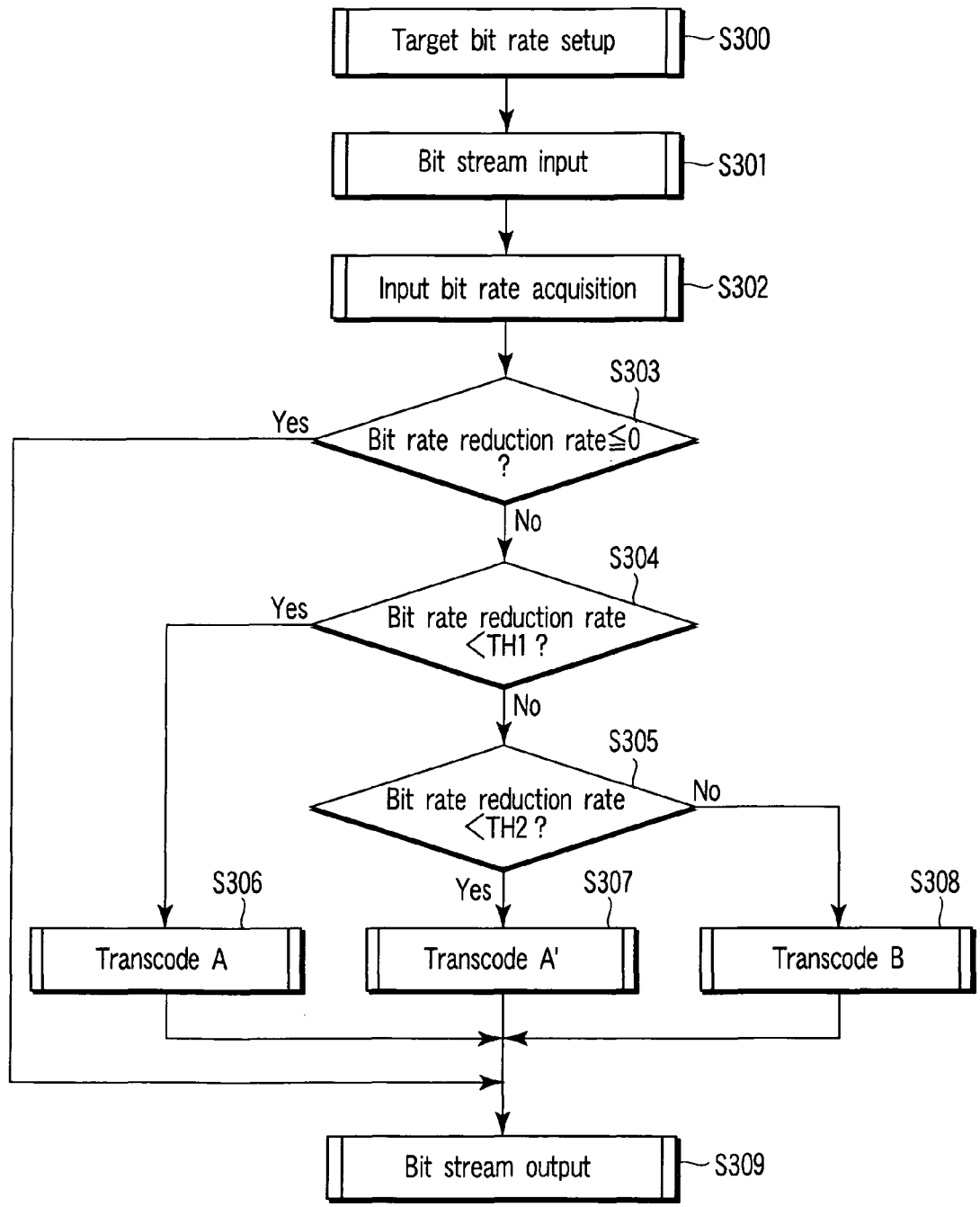
FIG. 10 is a flow chart showing a processing sequence of a video compression encode in the second embodiment.

According to the processing procedure of FIG. 10, it is possible to automatically determine an optimum transcode scheme from among the three transcode schemes A, A' and B by exploiting the characteristics of each transcode scheme explained by FIG. 5. In other words, by selecting an optimum transcode scheme automatically without the user's particular attention, it is possible to perform recompression so that the input bit stream approaches a target bit rate, consistently with high image quality and high efficiency.

Next, another processing procedure of the second embodiment will be explained by using a flow chart shown in FIG. 11. First, a conversion speed ratio, which is a conversion speed from an input video data 101 to an output video data 103, is set along with a target bit rate (step S400). In such state, an input bit stream is input (step S401), and an input bit rate is further obtained (step S402).

Next, a bit rate reduction rate of a target bit rate with respect to an input bit rate is determined according to [equation 1] in order to examine whether such bit rate reduction rate is equal to or lower than 0 (step S403). If the bit rate reduction rate is equal to or lower than 0, the input bit stream is simply output as an output bit stream (step S412). If the bit rate reduction rate exceeds 0, the conversion speed ratio is then compared to a first predetermined value R1 (such as R1=4) (step S404).

In step S404, if the conversion speed ratio is equal to or lower than the predetermined value R1, the bit rate reduction rate is then compared to a first threshold value TH1 (such as TH1=15%) (step S405).

In step S404, if the conversion speed ratio is larger than the predetermined value R1, or if the bit rate reduction rate is smaller than the threshold value TH1 in step S405, transcoding is performed based on scheme A using transcoder 206-1 (step S409).

In step S404, if the conversion speed ratio is equal to or below the predetermined value R1 and the bit rate reduction rate is not less than the threshold value TH1 in step S405, the bit rate reduction rate is then compared to a second threshold value TH2 (such as TH2=30%) (step S406). When the bit rate reduction rate is not less than the threshold value TH2 in step S406, the conversion speed ratio is then compared to a second predetermined value R2 (such as R2=2) (step S407).

If the bit rate reduction rate is smaller than the threshold value TH2 in step S406, or if the conversion speed ratio is larger than the predetermined value R2 in step S407, trancoding is performed based on scheme A' using transcoder 206-2 (step S410).

In step S407, if the conversion speed ratio is equal or lower than the predetermined value R2, transcoding is performed based on scheme B using transcoder 207 (step S411).

Lastly, a bit stream of the output video data 103 generated by the transcode of steps S409, S410 and S411, i.e., an output bit stream, is output (step S412). Here, the predetermined values R1 and R2 are determined in accordance with the processing speed of steps S409, S410 and S411. In other words, it is presupposed that the conversion speed ratio of step S409 is larger than R1, the conversion speed ratio of step S410 is larger than R2 and smaller than R1, and the conversion speed ratio of step S411 is smaller than R2.

Figure 11:
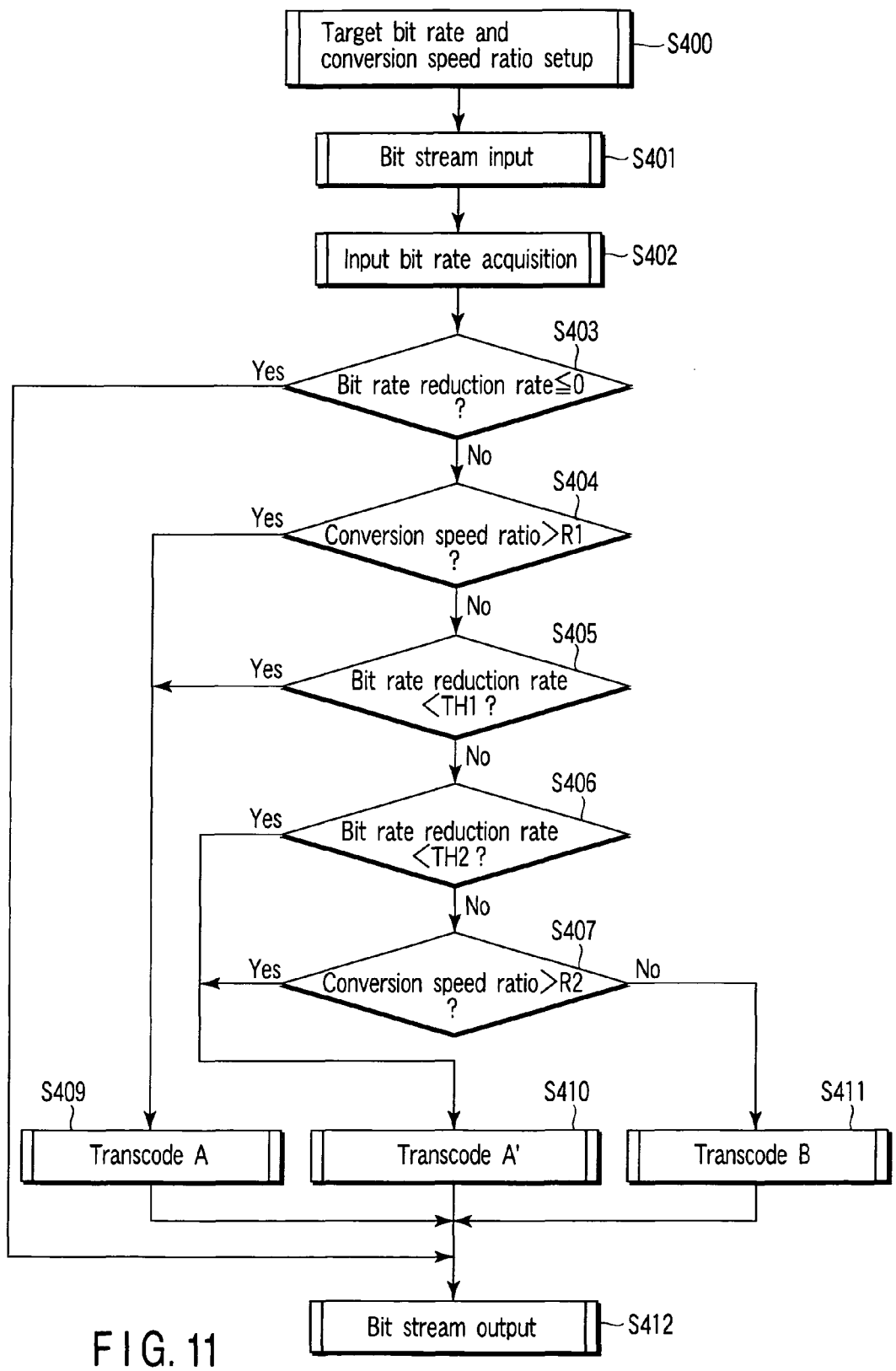
FIG. 11 is a flow chart showing another processing sequence of a video compression encode in the second embodiment.

As explained above, according to the processing procedure in FIG. 11, by taking the difference of the conversion processing speed shown in FIG. 6 into consideration, an optimum transcode scheme can be automatically determined from a bit rate information in consideration of the encoding characteristics of each transcode scheme explained by FIG. 5 within the range of the permissible conversion processing rate. Accordingly, an optimum transcode scheme is automatically selected without the user's attention, whereby the input video data is recompressed with high image quality and high efficiency at all times in an arbitrary bit rate in order to meet a target bit rate within a predetermined processing time.

Third Embodiment

Figure 12:
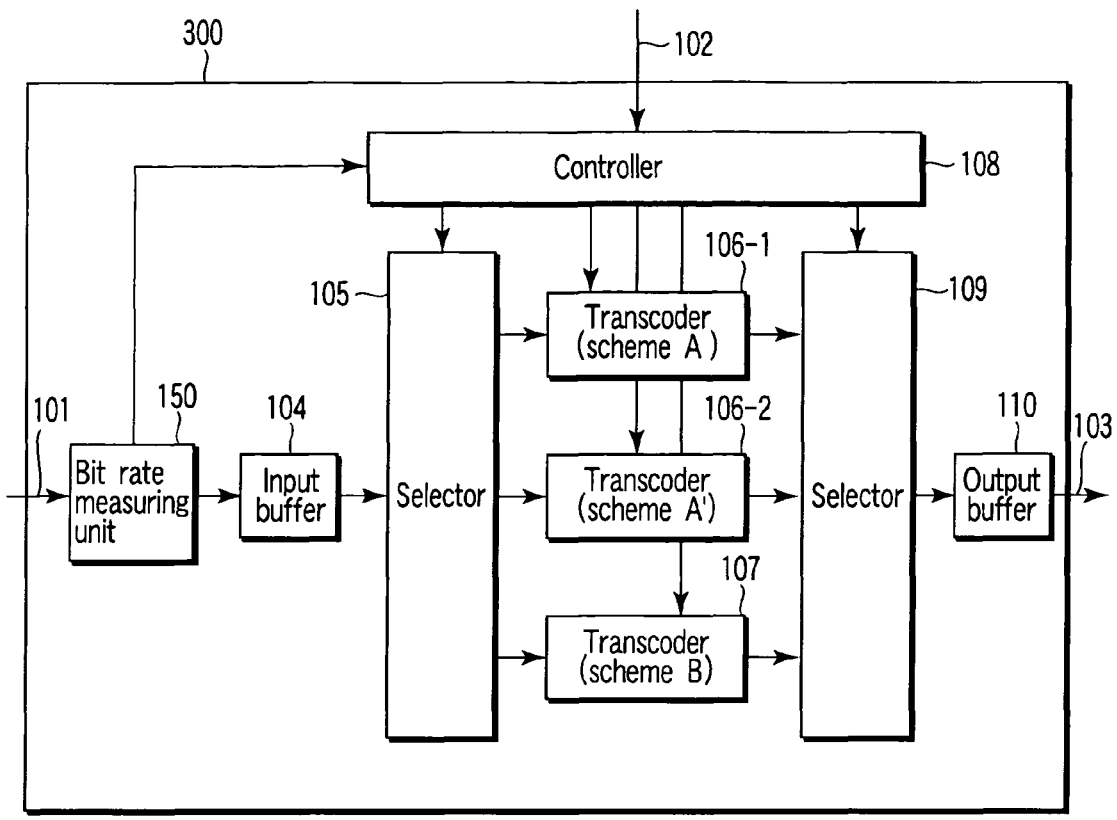
FIG. 12 is a block diagram showing a schematic structure of a video recompression apparatus according to a third embodiment of the present invention.

FIG. 12 illustrates a video recompression apparatus 300 according to a third embodiment of the present invention. In FIG. 12, components identical to the second embodiment shown in FIG. 9 are given the same symbols. In the third embodiment, in addition to the second embodiment, a bit rate measuring unit 150, which measures bit rates of an input video data 101 per predetermined time, is added. Based on the bit rate measured in such manner and recompression parameter 102, controller 108 shifts the transcode scheme, i.e., shifts to either one of transcoders 106-1, 106-2 and 107 to perform transcoding.

Figure 13:
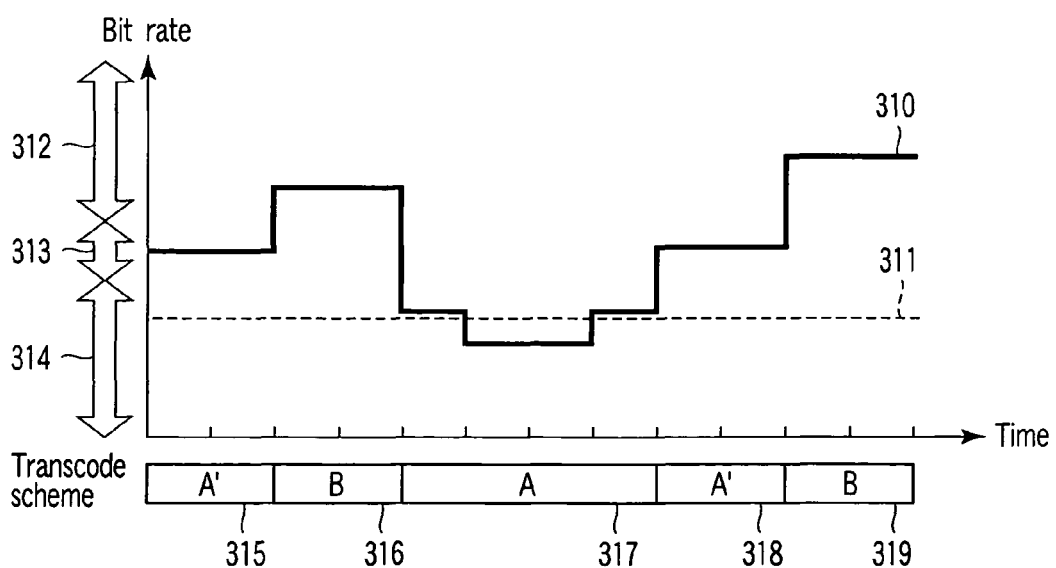
FIG. 13 illustrates an example of a shifting operation of a transcode scheme in the third embodiment.

An example of a shifting operation of the transcode scheme based on the bit rate measured by the bit rate measuring unit 150 is shown in FIG. 13. In FIG. 13, line 310 indicates time fluctuation of the bit rate of input video data 101 measured per predetermined time. Line 311 illustrates a target bit rate of the output video data 103. In FIG. 13, the transcode scheme is shifted in accordance with the ratio between the target bit rate and the input video data 101. More specifically, when the bit rate of input video data 101 is in the range indicated by arrow 314, transcode scheme A is selected, when the bit rate of input video data 101 is in the range indicated by arrow 313, transcode scheme A' is selected, and when the bit rate of input video data 101 is in the range indicated by arrow 312, transcode scheme B is selected. In such manner, shift of the transcode schemes are performed dynamically in the third embodiment.

As explained above, in the present embodiment, the controller adaptively and dynamically shifts among the three transcoders 106-1, 106-2 and 107 in order to transcode the input video data 101 most efficiently in accordance with the ratio between the present bit rate of the input video data 101 and the target bit rate. Accordingly, a high image quality transcoding can be performed in an arbitrary bit rate and by consistently high encoding efficiency.

The recompression processing of the video data based on the present embodiments explained above can be put into practice by hardware as well as by software through the use of computer, such as a personal computer. Therefore, according to the present invention, a storage media, which stores programs to perform recompression processing, can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for recompressing video data comprising:
   acquiring a recompression parameter including a reduction rate of reducing a target bit rate of output video data with respect to a bit rate of input video data encoded in a first encode scheme;
   recompressing the input video data by a first transcoder including the first encode scheme and a first compressibility, if the reduction rate is smaller than a threshold value, to generate the output video data; and
   recompressing the input video data by a second encode scheme different from the first encode scheme and a second compressibility smaller than the first compressibility, if the reduction rate is not less than the threshold value, to generate the output video data.

2. The recompressing method according to claim 1, further comprising: outputting the input video data directly as the output video data if the reduction rate is not more than 0.

3. A recompression apparatus for recompressing video data comprising:
   a first transcoder including a first compressibility and enabled to generate output video data by recompressing input video data encoded by a first encode scheme;
   a second transcoder including a second compressibility smaller than the first compressibility and enabled to generate the output video data by recompressing the input video data by a second encode scheme different from the first encode scheme; and
   a controller to control the first transcoder in order to perform the recompressing if the reduction rate of reducing the target bit rate of the output video data with respect to the bit rate of the input video data is smaller than a threshold value, and to control the second transcoder in order to perform the recompressing if the reduction rate is not less than the threshold value.

4. The recompression apparatus according to claim 3, wherein the first transcoder includes a re-quantizer to re-quantize an orthogonal transformation coefficient included in the input video data.

5. The recompression apparatus according to claim 3, wherein the first transcoder includes a decoder to decode the input video data in order to reproduce video signals and an encoder to encode the video signals in order to generate the output video data.

6. The recompression apparatus according to claim 3, wherein the second transcoder includes a decoder to decode the input video data in order to reproduce video signals and an encoder to encode the video signals by the second encode scheme in order to generate the output video data.

7. The recompression apparatus according to claim 3, further comprising measuring equipment to measure the bit rate of the input video data per unit of time, whereby the controller determines the reduction rate corresponding to the measured bit rate.

8. The recompression apparatus according to claim 3, wherein the recompression parameter further includes a conversion rate indicator of the output video data with respect to the input video data, and the controller controls the first transcoder to perform the recompressing if the conversion rate indicator is larger than a predetermined value and further controls the second transcoder to perform the recompressing if the conversion rate indicator is not more than the predetermined value.

9. A recompression method of video data comprising:
   acquiring a recompression parameter including a reduction rate of reducing a target bit rate of output video data with respect to a bit rate of input video data encoded in a first encode scheme;
   recompressing the input video data by the first encode scheme and first compressibility by re-quantizating an orthogonal transformation coefficient included in the input video data if the reduction rate is smaller than a first threshold value, to generate the output video data;
   recompressing the input video data by a second transcoder including the first encode scheme and second compressibility, by decoding the input video data to reproduce a video signal and encoding the video signal if the reduction rate is not less than the first threshold value and also smaller than a second threshold value; and
   recompressing the input video data by a second encode scheme different from the first encode scheme, and a third compressibility smaller than the first compressibility and second compressibility, if the reduction rate is not less than the second threshold value, to generate the output video data.

10. The recompression method according to claim 9, further including outputting the input video data directly as the output video data if the reduction rate is not more than 0.

11. A recompression apparatus of recompressing video data comprising:
    a first transcoder including a first compressibility, which includes a re-quantizer to re-quantize an orthogonal transformation coefficient included in input video data encoded by a first encode scheme and enabled to generate output video data by recompressing the input video data by the first encode scheme;
    a second transcoder including a second compressibility, which includes a decoder to reproduce a video signal by decoding the input video signal and an encoder to encode the video signal and enabled to generate the output video data by recompressing the input video data by the first encode scheme;
    a third transcoder including a third compressibility, which is smaller than the first compressibility and second compressibility, to generate the output video data by recompressing the input video data by a second encode scheme, which is different from the first encode scheme; and a controller to receive a recompression parameter including a reduction rate of reducing a target bit rate of the output video data with respect to a bit rate of the input video data and control the first transcoder to perform the recompressing if the reduction rate is smaller than a first threshold value, controls the second transcoder to recompress the video signal if the reduction rate is not less than the first threshold value and smaller than a second threshold value, and control the third transcoder to recompress the input video data if the reduction rate is not less than the second threshold value.

12. The recompression apparatus according to claim 11, wherein the third transcoder includes a decoder to decode the input video data in order to reproduce a video signal and an encoder to encode the video signal by the second encode scheme.

13. The recompression apparatus according to claim 11, further comprising a measuring unit to measure bit rates of the input video data per unit of time, and the controller determines the reduction rate corresponding to a measured bit rate.

14. The recompression apparatus according to claim 11, wherein the recompression parameter further includes a conversion rate indicator of the output video data with respect to the input video data, and the controller controls the first transcoder to recompress the input video data if the conversion rate indicator is larger than a first predetermined value, to control the second transcoder to recompress the video signal if the rate conversion ratio is not more than the first predetermined value and larger than a second predetermined value, and to further control the third transcoder to recompress the input video data if the conversion rate indicator is equal to or smaller than the second predetermined value.

15. A program stored in a computer readable medium for recompressing video data, the program comprising:
  means for acquiring a recompression parameter including a reduction rate of reducing a target bit rate of output video data with respect to a bit rate of input video data encoded in a first encode scheme;
  means for recompressing the input video data by a first transcoder including the first encode scheme and a first compressibility, if the reduction rate is smaller than a threshold value, to generate the output video data; and
  means for recompressing the input video data by a second encode scheme different from the first encode scheme and a second compressibility smaller than the first compressibility, if the reduction rate is not less than the threshold value, to generate the output video data.

16. A program stored in a computer readable medium for recompressing video data, the program comprising:
  means for acquiring a recompression parameter including a reduction rate of reducing a target bit rate of output video data with respect to a bit rate of input video data encoded in a first encode scheme;
  means for recompressing the input video data by the first encode scheme and first compressibility by re-quantizating an orthogonal transformation coefficient included in the input video data if the reduction rate is smaller than a first threshold value, to generate the output video data;
  means for recompressing the input video data by the first encode scheme and second compressibility, by decoding the input video data to reproduce a video signal and encoding the video signal if the reduction rate is not less than the first threshold value and also smaller than a second threshold value; and
  means for recompressing the input video data by a second encode scheme different from the first encode scheme, and a third compressibility smaller than the first compressibility and second compressibility, if the reduction rate is not less than the second threshold value, to generate the output video data.

* * * * *